(12) United States Patent
Wesson et al.

(10) Patent No.: US 8,488,158 B2
(45) Date of Patent: Jul. 16, 2013

(54) SYSTEMS AND METHODS FOR INSTRUCTING A PRINTER TO OPTIMIZE A PRINTED DIGITAL PATTERN

(75) Inventors: R. Matthew Wesson, Portland, OR (US); Robert Paratore, Redmond, WA (US); Robin Cole, Seattle, WA (US)

(73) Assignee: Adapx, Inc., Seattle, WA (US)

( * ) Notice: Subject to any disclaimer, the term of this patent is extended or adjusted under 35 U.S.C. 154(b) by 686 days.

(21) Appl. No.: 12/621,245

(22) Filed: Nov. 18, 2009

(65) Prior Publication Data

US 2010/0182636 A1 Jul. 22, 2010

Related U.S. Application Data

(60) Provisional application No. 61/115,842, filed on Nov. 18, 2008.

(51) Int. Cl.
*G06F 3/12* (2006.01)

(52) U.S. Cl.
USPC ...... 358/1.15; 358/1.9; 358/3.28; 235/472.03

(58) Field of Classification Search
USPC .................................................. 235/472.03
See application file for complete search history.

(56) References Cited

U.S. PATENT DOCUMENTS

| | | | |
|---|---|---|---|
| 2004/0114157 A1* | 6/2004 | Linder et al. | 358/1.9 |
| 2006/0262154 A1* | 11/2006 | Uchiyama et al. | 347/19 |
| 2007/0253019 A1* | 11/2007 | Mitamura | 358/1.15 |
| 2007/0273917 A1* | 11/2007 | Encrenaz et al. | 358/1.15 |
| 2008/0013113 A1* | 1/2008 | Gonzalez et al. | 358/1.5 |
| 2008/0074691 A1* | 3/2008 | Kubo | 358/1.15 |
| 2008/0285070 A1* | 11/2008 | Takeuchi et al. | 358/1.15 |
| 2008/0309993 A1* | 12/2008 | McKinley et al. | 358/474 |
| 2009/0268249 A1* | 10/2009 | Ikeda et al. | 358/1.18 |
| 2010/0315660 A1* | 12/2010 | Lynggaard | 358/1.6 |
| 2012/0113455 A1* | 5/2012 | Ebitani et al. | 358/1.14 |

FOREIGN PATENT DOCUMENTS

WO WO 2010059723 A2 * 5/2010

\* cited by examiner

*Primary Examiner* — Twyler Haskins
*Assistant Examiner* — Nicholas Pachol
(74) *Attorney, Agent, or Firm* — Richard C. Vershave; Foster Pepper PLLC

(57) ABSTRACT

Systems and methods for printer optimization. A method for optimizing a readable dot pattern printed on paper for use with a digital pen is disclosed herein. A test sheet is printed on a selected printer; the first test sheet has a plurality of regions. Each of the regions has a partial digital pattern configured with digitally readable indicia. Each of the indicia has a defined area. An outline is applied to each of the plurality of regions on the test sheet. Ink is applied onto the digital paper using a digital pen within the applied outlines. Data is uploaded from the digital pen to a processor. The smallest indicia readable by the digital pen are determined. A printer control file is updated with the determined smallest indicia.

20 Claims, 5 Drawing Sheets

SYSTEMS AND METHODS FOR INSTRUCTING A PRINTER TO OPTIMIZE A PRINTED DIGITAL PATTERN

PRIORITY CLAIM

This application claims priority to U.S. Provisional Patent Application No. 61/115,842 filed on Nov. 18, 2008, the subject matter of which is incorporated herein by reference in its entirety.

BACKGROUND OF THE INVENTION

Conventional digital paper systems, which include a digital writing surface and a digital pen device, have become very popular. The digital pen device determines its location in real time on the digital writing surface, which may include a visible or non-visible digital pattern. The writing surface may take the form of a digital tablet or digital paper, for example digital paper made by the Anoto Group AB and having an ANOTO® pattern. Various types of conventional digital pen devices include, but are not limited to, the MAXELL® digital pen, the NOKIA® digital pen, the LEAPFROG FLYFUSION® digital pen, LIVSCRIBE® Pulsepen, the ANOTO® digital pen, and the LOGITECH® digital pen. Besides knowledge of placement location, some digital paper systems also maintain records of information like pressure or time as well as various "state" values such as color or width.

The digital pattern enables the digital pen to interact with printed content, text, lines, images, etc. which may take the form of spreadsheets, maps, AutoCAD layouts, etc. The printed content is overlaid on top of, or otherwise applied to the digital pattern, which allows the digital pen to "see through" the printed content and capture its exact position from the digital pattern. To provide accurate position information, the indicia, pixels or other marks that makeup the pattern must have the desired size and spacing, and they must not merge with other inked or otherwise printed (e.g. black) areas on the paper. The properties of the digital pattern are adjustable, for example size, spacing and/or blackness level may be controlled through printer language set. The level of adjustment may be different for different printers. A digital pattern that is printed too large generates a "grayed-out" effect and results in the pattern overtaking any printed content. If the pattern is too small it is unreadable by the digital pen, thus making the document digitally degraded or even unusable.

As briefly discussed above printers controlled with hardware and software that instructs the printer how to print content on a page. Examples of printer control languages are Adobe® PostScript® and Hewlett Packard's® Printer Command Language. Any of these instructions interpret content to be printed and convert the content into the dots needed to form an output which results in a printed document. In other words it allows for the control of any brand of printer by modifying the output to allow for printing of content and a digital pattern. Different printers generally have radically different settings and capabilities and therefore may need to be altered to successfully print content and a digital printer.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
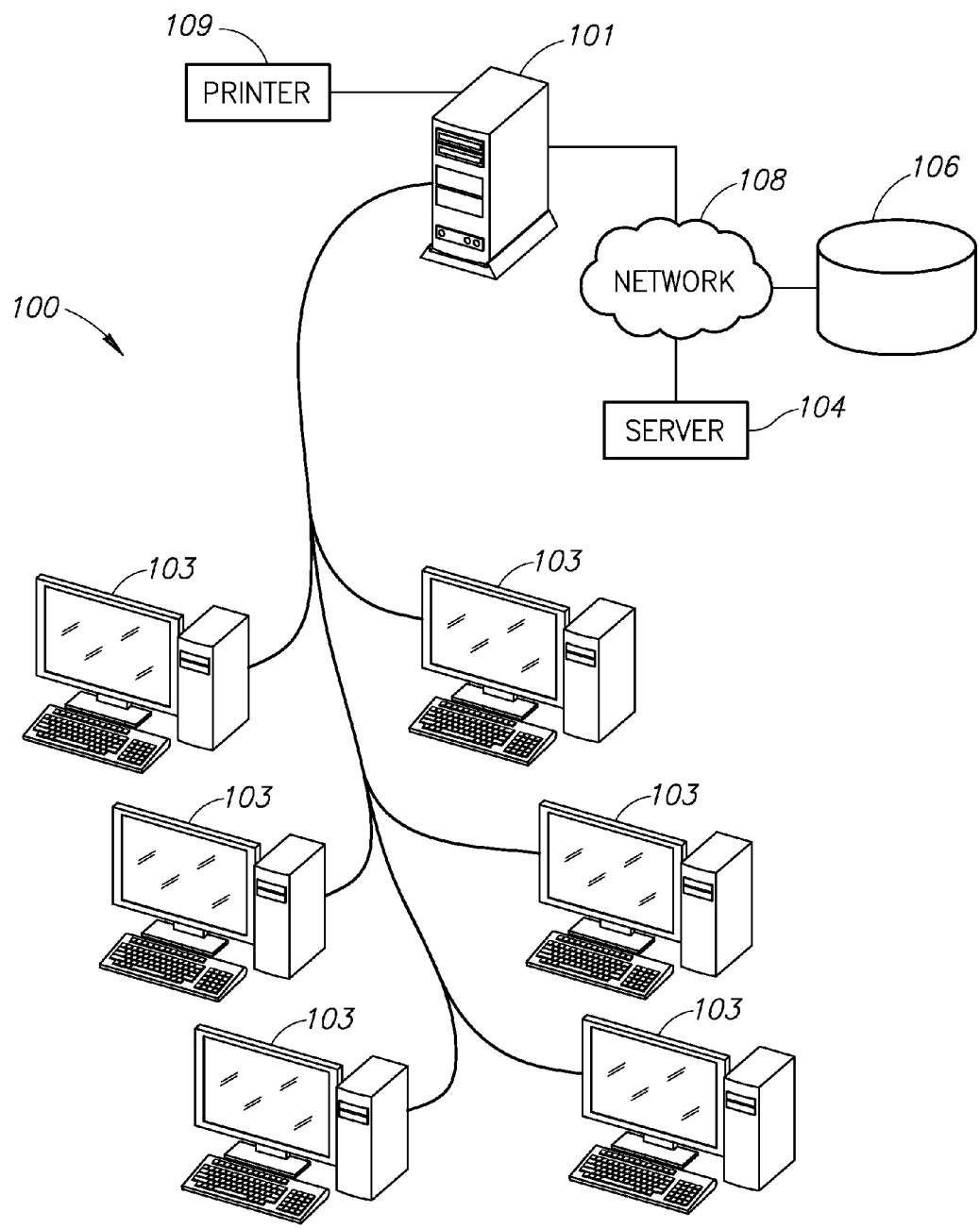
FIG. 1 is a schematic view of a system for printer optimization according to an embodiment of the present invention.

In the following description, certain specific details are set forth in order to provide a thorough understanding of various embodiments of the invention. However, one skilled in the art will understand that the invention may be practiced without these details or with various combinations of these details. In other instances, well-known systems and methods associated with, but not necessarily limited to, printer control programs, digital paper systems, digital pens and methods for operating the same may not be shown or described in detail to avoid unnecessarily obscuring descriptions of the embodiments of the invention.

The present invention is generally directed to systems and methods for controlling various aspects of a digital pattern readable by a digital pen. By way of example the systems and methods may control a shape, component, size, ink levels and/or density of the marks or indicia used to generate the digital pattern. In order for the digital pen to be functional, the pen requires a digital pattern to orient itself on the page. Because every printer is different, it is commonplace that a digital pattern will be incorrectly printed based on the make and model of the printer. In some cases the rendering of the digital pattern makes the pattern unreadable by the pen, in some cases the default printer settings interfere with the digital pattern and in other cases the printed content (e.g., text, spreadsheets, maps, charts, drawings, forms, etc) "hides" the digital pattern. For example if the content and the pattern are the same color, bleeding occurs and the pen can no longer determine its location on the page. Because the pen is generally configured to read indicia within the digital pattern printed in a range of black ink that is readable using infrared, it is easy to obscure the pattern when printing content.

One embodiment of the invention comprises a series of steps to ensure that the digital pattern is printed in such a way that it is accurately readable by a digital pen. The series of steps advantageously modifies the rendering of the printed content by controlling the size of the indicia that makes up the digital pattern as well as modifying the color content of the black ink. By way of an example, content sent to a printer may be processed using one or more software modules or instruction sets to configure or even optimize the printer output. At least one described method produces the digital pattern with optimized settings to make the pattern readable by the digital pen when the digital pattern has been applied onto printed ink content or alternatively when the content is overlaid onto the digital pattern. One of the optimization steps may include adjusting the size of the indicia comprising the digital pattern to minimize any obscuring that may result from certain printed content.

At least one embodiment of the present invention relates generally to controlling rendering settings for a printer to generate a digital pattern readable by a digital pen, and more specifically controlling the shape, component, size, ink levels and/or density of the indicia used to generate the digital pattern. To determine the proper indicia for generating the digital pattern, the systems and methods described herein print test sheets on a printer containing different sized and/or shaded indicia and prompts a user to test each of the patterns with the digital pen. Once the user tests each of the different patterns, the data acquired by the digital pen is uploaded to one or more computers, processors, or an equivalent device. The system then determines the optimum size and/or shade for the indicia settings as taken from the subset of test patterns readable by the pen. The system preferably selects the smallest and most lightly shaded arrangement that may be accurately and robustly read by the pen. The settings are then stored as "optimized" printer instructions in a generated printer control file that provide rendering instructions to a printer.

FIG. 1 is a schematic view of a system 100 for optimizing a printer to produce a desired digital pattern according to an embodiment of the present invention. The system 100 includes a computer 101 which may be networked or otherwise in communication with a plurality of other computers 103, and a printer 109. In an alternate embodiment, the computer 101 communicates with a plurality of computers 103, a printer 109, a server 104, a data storage center 106, and/or a network 108, such as an intranet or the Internet. Also a bank of servers, a wireless device, a cellular phone and/or other processing devices may be used in lieu of the computer 101. In one embodiment, a postscript file stores computer executable instructions for optimizing the printer. The postscript file may be stored in the data storage center 106 or locally within a memory of the computer 101. Additionally or alternatively, a printer control language file, a graphics device interface, a peripheral component interconnect or a printer instruction set may be used for optimizing a printed digital pattern.

In one embodiment, the postscript file executed by operation of the server 104 or computer 101 alters the print output sent to the printer 109. A postscript generation code includes instructions to be run by a processor and/or may alternatively include instructions storable on the printer 109, where such instructions are referred to as on board postscript raster image processing ("RIP") instructions. The postscript generation code preferably, places "correct" values into a postscript file, where in turn specifies what to draw and how to draw it. The instructions may include, but are not limited to, encoded text that sends the printer a dot size and an encoded black level setting. The instructions may further include how to transmit the modified output content to the printer 109.

Figure 2:
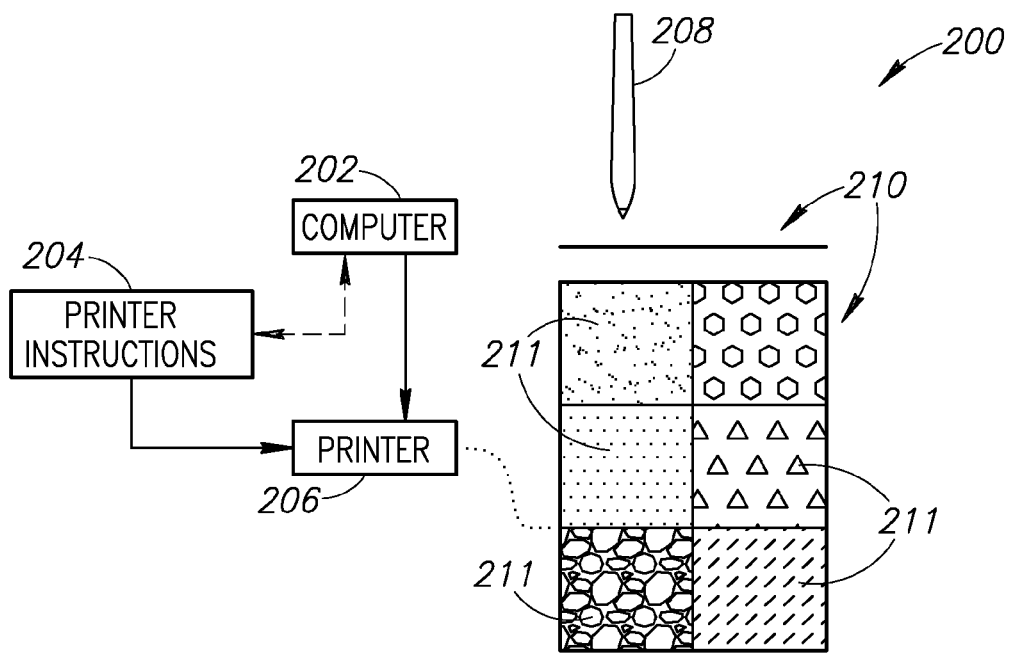
FIG. 2 is a schematic view of a system for printer digital paper for use with a digital pen according to an embodiment of the present invention.

FIG. 2 is a schematic view of a system 200 for printing digital paper 210 for use with a digital pen 208 according to an embodiment of the present invention. A computer 202 sends printer instructions 204 to a printer 206 to print a digital pattern 211 on digital paper 210. The digital pattern 211, includes a series of indicia that may take the form of dots, marks, shapes, slashes, etc. that when combined and arranged in a desired pattern provides location information to the pen 208. The digital pattern 211 may interact with the digital pen 208, which may be broadly referred to as an indicating device or a selection device that may or may not employ ink during use. By way of example, the digital pen 208 may be used to mark on, select, indicate, or otherwise interact with the digital paper 210. The digital pattern 211 on the digital paper 210 may generally take the form of a pattern that uniquely identifies positional coordinates on the digital paper 210 In one embodiment; the pattern may have an initial form similar to an ANOTO® pattern. The digital pen 208 may be used to store, record or even contemporaneously transmit any information such as any marks, selections, indications or interactions. Information stored or recorded may be transmitted or uploaded to the computer 202 at a later time, for example when the user docks the digital pen into a docking station (not shown).

Figure 3:
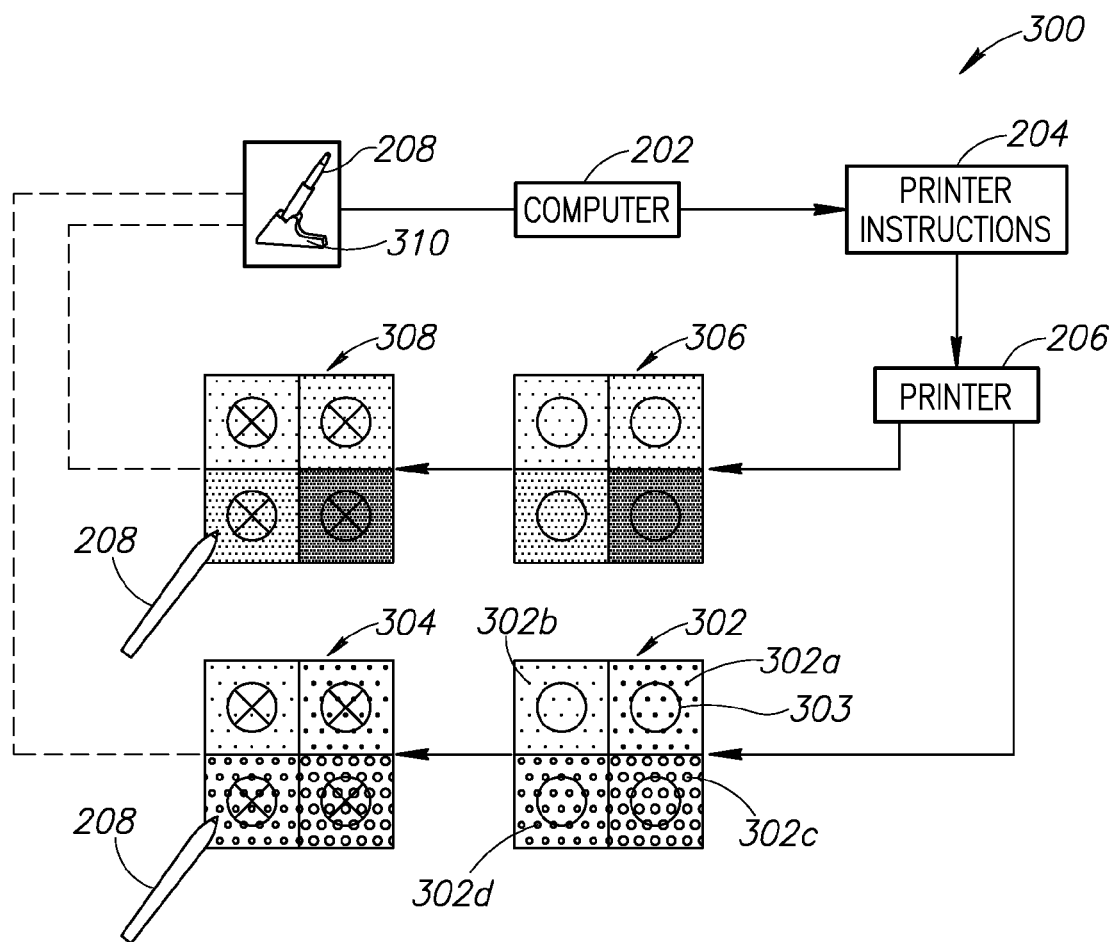
FIG. 3 is a schematic view of a method for printer optimization according to an embodiment of the present invention.

FIG. 3 is a schematic view of a method 300 for printer optimization according to an embodiment of the present invention. The computer 202 sends printer instructions 204 to the printer 206 to print a first test sheet 302 and optionally a second test sheet 306 for use in printer optimization. The test sheet 302 may include multiple regions 302a, 302b, 302c and 302d that contain different digital patterns respectively. For example, in each region the indicia has a different size, as defined by area. On test page 302 the size of the indicia that makes up the digital varies from small to large across the regions. In each region 302a-302d, a shape outline 303 is applied onto the digital pattern as a border for identifying an interaction section for pen marking The shape outline 303 may be of any design (circles, squares, a maze etc.), but preferably is a design that clearly suggests the interaction section to a user. The user then interacts with the test pages 302, by preferably sketching or marking inside the shape outlines 303. As shown, in the illustrated embodiment, the user preferably draws an "X" within the boundary of the shape outline 303 resulting in a first sketched test page 304. The user then docks the pen 208 into the dock 310 which communicates the results to the computer 202. The computer 202, uploads the data from the pen (digital ink) and analyzes the pen marks with respect to the various regions 302a-302d having the different patterns. In relation to the first sketched test page 304, the computer 202 determines the smallest sized indicia that allows the digital pen to accurately and robustly determine its location on the page.

Preferably, the computer sends instructions 204 to the printer 206 to print test page 306 using the selected indicia size. On test page 306, the black level is printed from the highest level to the lowest level. The black level settings range from one hundred percent (100%) black which is defined as being infrared absorbing and does not reflect any light in any part of the visible spectrum to a lower percentage of black that is lightened with the introduction of white (a graylevel), thus giving it infrared reflecting qualities. The user again marks within the outlines 303, which may include drawing another "X" to produce a second sketched test page 308. Once again, the user docks the pen 208 into the dock 310 for transceiving data between the pen 208 and the computer 202. The computer 202 uploads data from the pen 208 and analyzes each of the sketches. In relation to the second sketched test page 304, the computer 202 determines the lowest level of black that allows the digital pen 208 to determine its location on the page. The computer 202 stores black level printer instructions 204 for future digital pattern printing.

Figure 4:
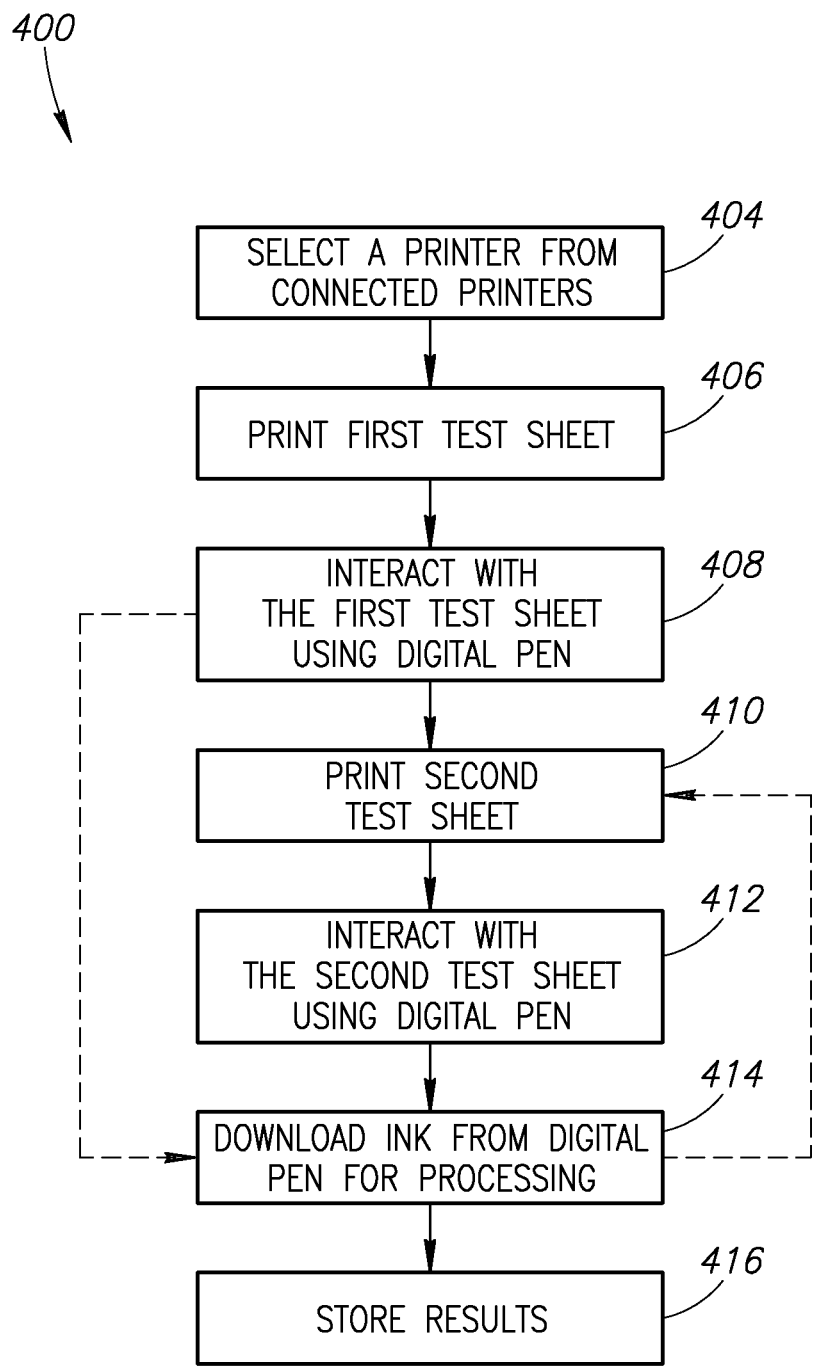
FIG. 4 is a flowchart showing a method for printer optimization according to an embodiment of the present invention.

FIG. 4 is a flowchart showing a method 400 for printer optimization according to an embodiment of the present invention. At block 404, the method 400 prompts a user to select a printer. The user may select a connected printer, or alternatively may select a printer from available printers on a network. Once a printer is selected, a test sheet is printed at block 406, the test sheet having a plurality of regions, wherein each region includes a digital pattern and a shape outline configured to direct a user's markups with a digital pen. The same outline may be repeated multiple times in each region; however in each region the digital pattern is slightly different. In each region, the indicia for the digital pattern may be assigned a desired size, based on area, from smallest to largest, with different sized indicia provided in different regions.

Figure 5:
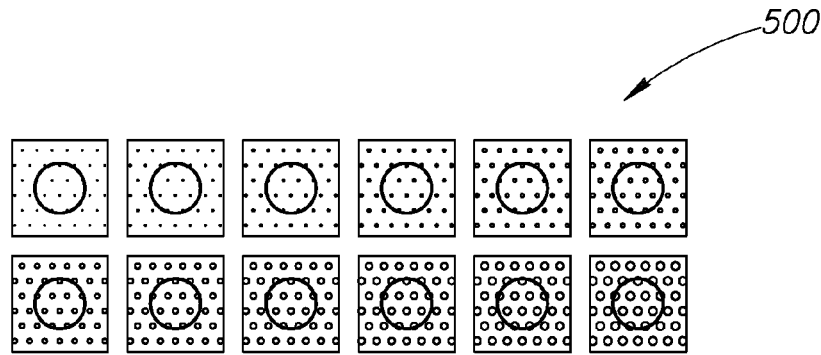
FIGS. 5 and 6 are top plan views of a printed test page generated using the printer optimization method according to an embodiment of the present invention.

Alternatively the indicia could be sized based on diameter, radius, length, width, etc. By way of example, the indicia for the digital pattern may have a linear dimension of about 0.0001 mm to about 0.1 mm. In a preferred embodiment the indicia sizes ranges from about 0.001327 mm to about 0.042857 mm. FIG. 5 shows a series of outlines printed on a digital pattern, with the indicia sizes in each region arranged from smallest indicia size to largest.

Once the test page is printed with the digital pattern having a series of different sized indicia, the user is prompted at block 408 to interact with the printed page using the digital pen. The user sketches in each of the outlines with the digital pen. The pen stores the data for each of these interactions. The data is uploaded to the computer and then processed as indicated in block 414.

Figure 6:
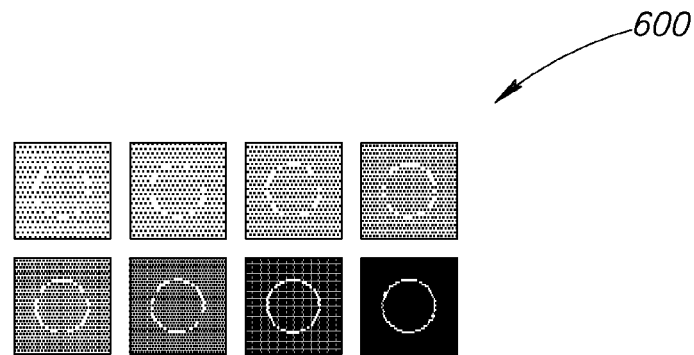

At block 410, a black level test page will be printed, preferably using the calculated indicia size. For black level printing, the digital pattern is printed from thirty percent (30%) black level to one hundred percent (100%) black level. The user, using a digital pen at block 412, interacts with each outline and the results are stored within the pen. The foregoing example is shown in FIG. 6. As described above, a shape outline is produced on each of the digital patterns. The user, using a digital pen interacts with each pattern, by sketching an "X" substantially with in the shape outline and corresponding digital ink data is stored within the pen.

At block 414, the data from the digital pen is downloaded for processing. Block 412 may optionally occur after block 408 and then again after block 412 or may occur after the completion of block 412. It is preferable, in some embodiments, to calculate the optimum indicia size size prior to calculating black level, because indicia size may affect the preferred black level. The digital ink, used to interact with the patterns described in block 408 and 412, is uploaded in a computer and analyzed. The method determines the smallest indicia readable (smallest indicia that still allows the pen to determine its location on the page) by the pen and stores that data. The ink is then tested with relation to black level. The method determines the lowest black level readable by the pen and stores the data.

At block 416 the calculated results are stored within a text file. By way of example the text file may include, but is not limited to, the printer name, the printers default DPI and the optimum dot size and black level. The text file may be shared with others and the settings are optionally saved in an operating system registry.

FIGS. 5 and 6 are top plan views of a printed test page generated using the printer optimization method according to an embodiment of the present invention. Shown in FIG. 5 is a series of shape outlines applied to a digital pattern having varying dot sizes. Shown in FIG. 6 is a series of shape outlines applied to a digital pattern with varying black levels.

Figure 7:
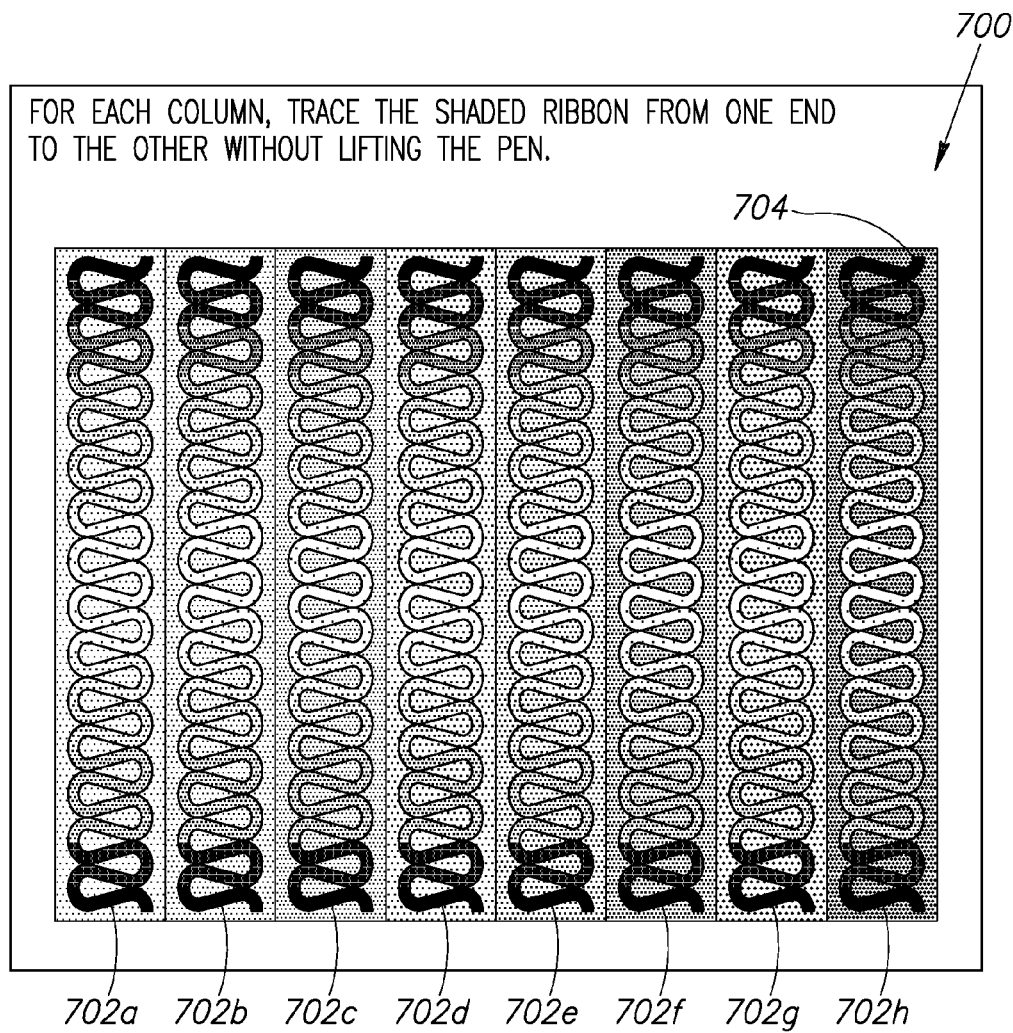
FIG. 7 is a top plan view of an additional or alternative test page generated using the printer optimization method according to an embodiment of the present invention.

FIG. 7 is a top plan view of an additional or alternative test page 704 generated using the printer optimization method according to an embodiment of the present invention. A test page is printed with multiple regions 702a-702h that contain different digital patterns respectively. For example, in each region the indicia has a different size. In each region 702a-702h, a shape outline 704 is applied onto the digital pattern as a border for identifying an interaction section for pen marking. The outline 704 takes the form of a curved, gradient-shaded ribbon. The user then interacts with the test page 700, by preferably sketching or marking inside the shape outlines 704 from end to end. The user then docks the pen into a dock which communicates the results to a computer. The computer uploads the data from the pen (digital ink) and analyzes the pen marks with respect to the various regions 702a-702h having the different patterns. The ends of each shape outline 704 are shaded in one hundred percent (100%) black. Black level values are determined by how close to the black ends of the shape outlines 704, the digital pen can still determine its location on the page. In addition, each curve in the shape outline contains three testing areas. Testing areas are preferably areas around each curve configured to provide the highest quality interaction between the digital pen and the digital pattern. Each of the regions 702a-702h are assigned scores based on how many adjacent testing areas result in the digital pen determining its location on the page. The optimized black level is determined by the region with the highest score. Of all regions having a score within some tolerance of the highest score, the region using the smallest indicia size is chosen for the indicia size setting.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A method for controlling rendering settings for a printer to generate one or more digital patterns that are readable by a digital pen, the method implemented on at least one computer, the method comprising:
   selecting a printer;
   printing a first test sheet on the selected printer, the first test sheet having a plurality of regions, each region having a different digital pattern configured with an arrangement digitally readable indicia, each indicia having a defined area;
   applying an outline to each of the plurality of regions on the first test sheet;
   interacting with each region using the digital pen, wherein each interaction is substantially within at least one of the applied outlines;
   uploading data from the digital pen to a processor;
   determining the smallest indicia readable by the digital pen; and
   updating a printer control file with the determined smallest indicia, the printer control file usable by the printer to produce a desired digital pattern.

2. The method of claim 1 further comprising printing a second test sheet on the selected printer, the second test sheet having a plurality of regions, each region having a different digital pattern configured with an arrangement of digitally readable indicia, each indicia having a black ink level.

3. The method of claim 2 further comprising applying an outline to each of the plurality of regions on the second test sheet.

4. The method of claim 3 further comprising determining the lowest black level readable by the digital pen.

5. The method of claim 4 further comprising updating a printer control file with the determined lowest black level.

6. The method of claim 2 wherein the black level of the indicia further comprises a black level from about one hundred percent black level to about thirty percent black level inclusive.

7. The method of claim 1 wherein the at least one area of the indicia further comprises indicia sized from 0.0001 mm to 0.1 mm inclusive.

8. The method of claim 1 wherein updating a printer control file further comprises storing the calculated results in a text file for distribution.

9. The method of claim 1 wherein updating a printer control file further comprises modifying an operating system file with the updated printer control settings.

10. The method of claim 1 wherein selecting a printer further comprises selecting a printer from a plurality of printers connected to the computer.

11. A method for altering output from a printer in order to optimize a digital pattern that is read by a digital pen, the method implemented on at least one computer comprising:
    selecting a printer;
    printing a first test sheet on the selected printer, the first test sheet having a plurality of regions, each region having a different digital pattern configured with an arrangement of digitally readable indicia, each indicia having a black ink level;
    applying an outline to each of the plurality of regions on the first test sheet;
    interacting with each region using the digital pen, wherein each interaction is substantially within at least one of the applied outlines;
    uploading data from the digital pen to a processor;
    determining the lowest black level readable by the digital pen; and
    updating a printer control file with the determined lowest black level the printer control file usable by the printer to produce a desired digital pattern.

12. The method of claim 11 further comprising printing a second test sheet on the selected printer, the second test sheet having a plurality of , each region having a different digital pattern configured with an arrangement digitally readable indicia, each indicia having a defined area.

13. The method of claim 12 further comprising applying an outline to each of the plurality of regions on the second test sheet.

14. The method of claim 13 further comprising determining the smallest indicia readable by the digital pen, the printer control file usable by the printer to produce a desired digital pattern.

15. The method of claim 14 further comprising updating a printer control file with the determined smallest indicia.

16. A system for optimizing a readable dot pattern printed on paper, the system implemented on at least one computer comprising:
    a printer;
    a digital pen; and
    a processor in data communication with the digital pen and the printer, wherein the processor is programmed to analyze printer optimization results comprising:
    a first component configured to display at least one printer connected to a computer;
    a second component configured to print a first test sheet on the selected printer, the first test sheet having a plurality of regions; each region having a different digital pattern configured with digitally readable indicia, each indicia having a defined area;
    a third component configured to apply an outline onto each of the plurality of regions on the first test sheet;
    a fourth component configured to upload ink from the digital pen into a memory of the computer, the uploaded ink corresponding to a mark made by the digital pen within at least one outline;
    a fifth component configured to process the uploaded data from the digital pen to determine the smallest indicia readable by the digital pen; and
    a sixth component configured to store the results in a file configured to provide modified digital pattern printing instructions to the printer.

17. The system of claim 16 further comprising a seventh component configured to print a second test sheet on the selected printer, the second test sheet having a plurality of regions; each region having a different digital pattern configured with digitally readable indicia, each indicia having a black ink level.

18. The system of claim 17 further comprising an eighth component configured to apply an outline to each of the plurality of regions on the second test sheet.

19. The system of claim 16 further comprising a ninth component configured to determine the lowest black level readable by the digital pen.

20. The system of claim 16 further comprising a tenth component configured to update a printer control file with the determined lowest black level.

* * * * *